(12) United States Patent
Nagendra et al.

(10) Patent No.: US 7,231,463 B2
(45) Date of Patent: Jun. 12, 2007

(54) MULTI-LEVEL RING PEER-TO-PEER NETWORK STRUCTURE FOR PEER AND OBJECT DISCOVERY

(75) Inventors: Gururaj Nagendra, Beaverton, OR (US); Shaofeng Yu, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 10/036,466

(22) Filed: Jan. 4, 2002

(65) Prior Publication Data

US 2003/0131044 A1 Jul. 10, 2003

(51) Int. Cl.
*G06F 15/16* (2006.01)
*G06F 15/167* (2006.01)

(52) U.S. Cl. ............... 709/251; 709/212; 709/216; 709/249

(58) Field of Classification Search ............. 709/212, 709/216, 238, 249, 251; 370/401, 405
See application file for complete search history.

(56) References Cited

U.S. PATENT DOCUMENTS

| | | | | |
|---|---|---|---|---|
| 4,885,742 A | * | 12/1989 | Yano | 370/408 |
| 4,985,888 A | * | 1/1991 | Madge et al. | 370/405 |
| 5,226,039 A | * | 7/1993 | Frank et al. | 370/405 |
| 6,145,004 A | * | 11/2000 | Walsh | 709/227 |
| 6,400,682 B1 | * | 6/2002 | Regula | 370/223 |
| 6,463,064 B1 | * | 10/2002 | Broockman et al. | 370/401 |
| 6,590,928 B1 | * | 7/2003 | Haartsen | 375/134 |
| 6,597,658 B1 | * | 7/2003 | Simmons | 370/221 |
| 6,636,854 B2 | * | 10/2003 | Dutta et al. | 707/10 |
| 6,651,171 B1 | * | 11/2003 | England et al. | 713/193 |
| 6,693,869 B1 | * | 2/2004 | Ballantyne | 369/84 |
| 6,694,412 B2 | * | 2/2004 | Frank et al. | 711/153 |
| 6,965,560 B2 | * | 11/2005 | Ying et al. | 370/222 |
| 7,065,579 B2 | * | 6/2006 | Traversat et al. | 709/230 |
| 7,065,587 B2 | * | 6/2006 | Huitema et al. | 709/245 |
| 2002/0191250 A1 | * | 12/2002 | Graves et al. | 359/128 |
| 2003/0009660 A1 | * | 1/2003 | Walker | 713/153 |

OTHER PUBLICATIONS

Gnutella, Gnutella & Firewalls, Gnutella News, 3 pages http://www.gnutellanews.com/information/firewalls.shtml.

(Continued)

*Primary Examiner*—Bunjob Jaroenchonwanit
*Assistant Examiner*—Ramsey Refai
(74) *Attorney, Agent, or Firm*—Blakely, Sokoloff, Taylor & Zafman LLP (57) ABSTRACT

In one embodiment of the invention, a Peer-to-Peer (P2P) subsystem includes a cache of a current peer and a peer locator. The current peer is in a current ring at a current level. The cache stores information of ring peers within the current ring. The current ring is part of a hierarchical ring structure of P2P nodes. The hierarchical ring structure has at least one of a lower level and a upper level. The peer locator locates a target peer in the cache in response to a request.

21 Claims, 4 Drawing Sheets

OTHER PUBLICATIONS

Todd Spangler, From Revolution to Evolution, Interactive iWeek Jun. 11, 2001, 5 pages, Ziff Davis Media Inc.

Gnutella, Welcome to Gnutella, Gnutella, 2 pages http://gnutella.wego.com/.

Gnutella, What is Gnutells?, Gnutella News, 4 pages http://www.gnutellanews.com/information/what_is_gnutell.shtml.

Dan Kegal, NAT and Peer-to-peer networking, 4 pages, Cal Tech., http://alumni.caltech.edu/~dank/peer-nat.html.

Microsoft, Ensuring Great Experiences with NAT Traversal and Universal Plug and Play in Windows XP, Microsoft.com website, Jul. 2001, 6 pages, Microsoft Corp.

Microsoft, UPnP NAT Traversal FAQ, Microsoft.com website, Jul. 2001, 6 pages, Microsoft Corp.

Scholl, napster messages, Apr. 2000, 25 pages http://opennap.sourceforge.net/napster.txt.

* cited by examiner

MULTI-LEVEL RING PEER-TO-PEER NETWORK STRUCTURE FOR PEER AND OBJECT DISCOVERY

BACKGROUND

1. Field of the Invention

This invention relates to networks, and in particular, the invention relates to peer-to-peer communication.

2. Description of Related Art

Peer-to-Peer (P2P) communication has recently become popular. P2P communication allows a computer or a network device to communicate or locate another computer or network device across a network. Currently, computers and other Internet protocol (IP)-based devices can be discovered using the existing Domain Name System (DNS) or using P2P mechanisms like Napster or Gnutella.

These techniques for P2P communication have a number of disadvantages. Napster and DNS are server-based name services. More particularly, the DNS is a distributed Internet directory service. DNS is used mostly to translate between domain names and IP addresses, and to control Internet message delivery. In server-based name services such as DNS and Napster-like P2P systems, the name servers must maintain a large list of computers or network devices that they support. For a large number of names, DNS needs complex software and processing power for name resolutions. It also requires heavy administration and maintenance. Moreover, DNS-like techniques may contain state IP addresses because of the typically high Time-To-Live (TTL) validity in resource records.

In distributed systems like Gnutella, a message is required to traverse through the network one peer at a time and branches out until the result is found in a peer. This traversing generates a lot of network traffic, especially when the amount of messages is large. Since Gnutella employs a flat model, it may not scale well with the network. It also does not maintain any index or cache of other computers and may cause performance degradation when the network grows. In addition, it is difficult and inconvenient to form and name groups of computers in these systems.

Another technique uses bootstrap servers for its operation (e.g., Legion). These bootstrap servers run agents or managers that manage various requests on the P2P network or agents. If a peer needs to discover another peer, it may find it in the directory structure provided by the managers. One disadvantage of this technique is that the bootstrap server is a single point of failure. A failure of the bootstrap server may render the service non-operational.

Therefore, there is a need to have an efficient technique to provide P2P communication.

BRIEF DESCRIPTION OF THE DRAWINGS

The features and advantages of the present invention will become apparent from the following detailed description of the present invention in which.

DESCRIPTION OF THE INVENTION

The invention is a technique to provide Peer-to-Peer (P2P) communication among peers. In one embodiment of the invention, a P2P subsystem includes a cache of a current peer and a peer locator. The current peer is in a current ring at a current level. The cache stores information of ring peers within the current ring. The current ring is part of a hierarchical ring structure of P2P nodes. The hierarchical ring structure has at least one of a lower level and an upper level. The peer locator locates a target peer in the cache in response to a request. If the target peer is not found in the cache, the current peer forwards the request to either the other peers in the current ring at the current level or a peer at an upper level.

The technique in the present invention achieves at least the following advantages: (1) A server software is not needed, (2) Insignificant or minimum administration and maintenance, (3) No zone file containing all the peers is needed, (4) No stale Internet Protocol (IP) addresses are kept for a long time, (5) Less network traffic than the distributed technique, and (6) High scalability.

In the following description, for purposes of explanation, numerous details are set forth in order to provide a thorough understanding of the present invention. However, it will be apparent to one skilled in the art that these specific details are not required in order to practice the present invention. In other instances, well-known structures are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk ROM (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

A process is terminated when its operations are completed. A process may correspond to a method, a function, a procedure, a subroutine, a subprogram, etc. When a process corresponds to a function, its termination corresponds to a return of the function to the calling function or the main function.

Figure 1:
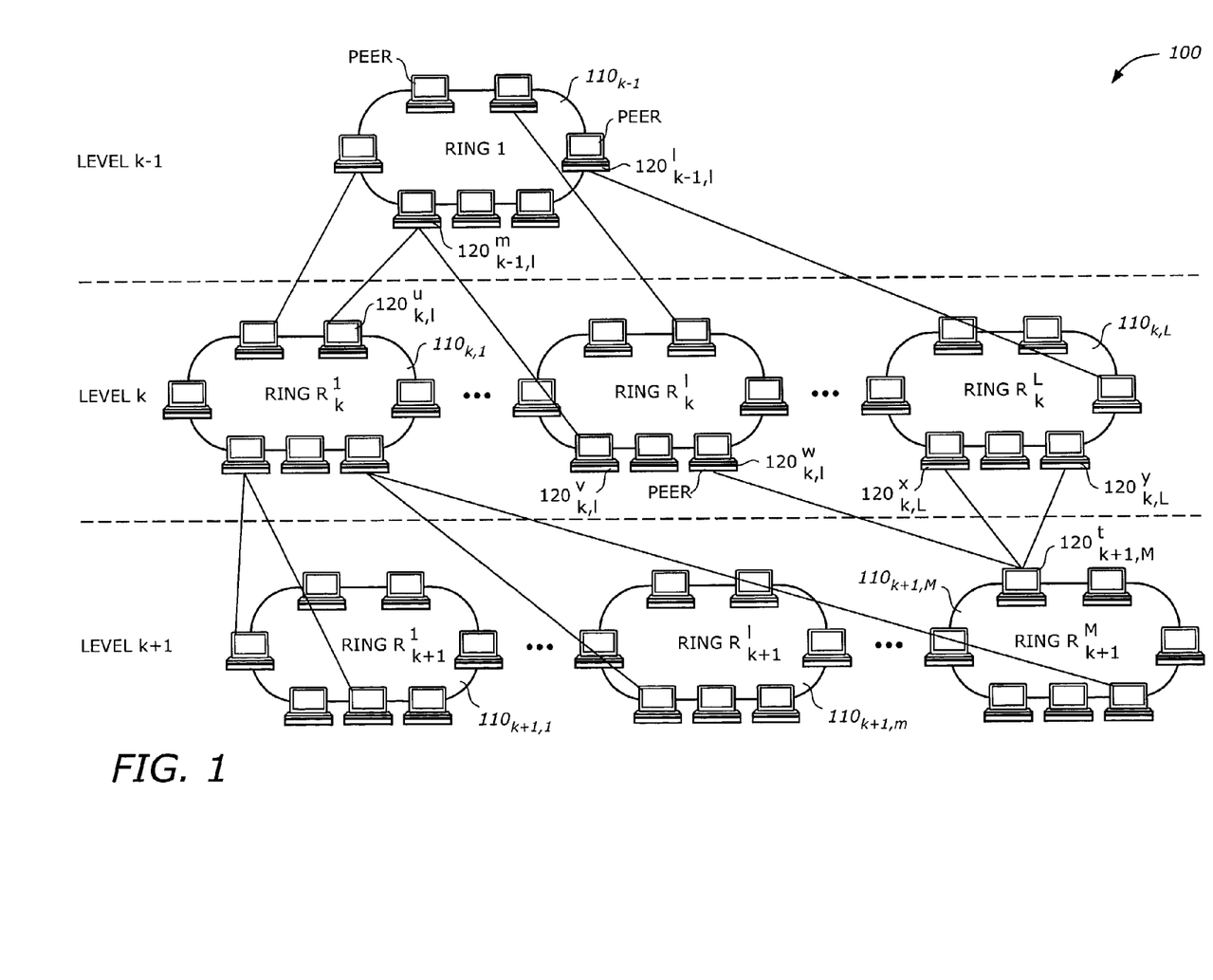
FIG. 1 is an exemplary diagram illustrating a system 100 in which one embodiment of the invention can be practiced.

FIG. 1 is an exemplary diagram illustrating a system 100 in which one embodiment of the invention can be practiced. The system 100 includes ring $110_{k-1}$, L rings $110_{k,1} \ldots 110_{k,1} \ldots 110_{k,L}$, M rings $110_{k+1,1} \ldots 110_{k+1,m} \ldots 110_{k+1,M}$.

The system 100 is a model of a hierarchical ring structure of the peer nodes connected to a network. The hierarchical ring structure is similar to a tree structure where there are a number of levels. For illustrative purposes, three levels k−1, k and k+1 are shown. However, the number of levels may be less than three or more than two. Also, a level may have any number of rings. Rings at level k−1 are referred to as upper rings which are at one hierarchical level higher than level k. Rings at level k are referred to as the current rings. Rings at level k+1 are referred to as lower rings which are at one hierarchical level lower than level k.

Each ring or group has a number of peers connected together. Here, the term "peer" refers to a node, a network device, or a computer that participates in a group activity in a network. A group activity may involve a number of peers that are linked together for a common objective. For example, users of shared programs may form into peers in an activity of shared programs. The group activity may be, for example, a business meeting, a multi-player game, a music sharing, etc. The term "connected," "linked," "connection," or "link" here may mean a physical connection and/or a logical or informational connection. When a line shows a connection or link between two peers, it means that one peer contains information of the other peer. The information includes at least an IP address of the peer.

Normally, a peer at an upper level contains information of a peer at a current level. It is contemplated that a peer at a lower level may also contain information of a peer at a current level. A peer in any ring is connected to any other peer via the hierarchical ring structure. This is possible because, in addition to being connected to peers within a ring, a peer may be may be connected to one or more peers at the upper level and one or more peers at the lower level.

A ring s at a level k has a number of peers. In each ring, all peers are connected together, meaning that each peer has information about any other peers within the same ring. In FIG. 1, the notation for the number of peers for a ring s at level k is P(k,s). Ring $110_{k-1}$ has P(k−1,1) peers $120_{k-1}^{1}$ to $120_{k-1}^{P(k-1,1)}$. Also, in this illustrative example, level k−1 has one ring. At level k, there are L rings. At level k+1, there are M rings.

A peer P in a ring may be connected to one or more peers at a level immediately lower than its level. The ring at the upper level is the index ring of peers. In addition to caching information of other peers in the ring, each peer of an index ring also contains information of the lower level. The fan-out ratio, i.e. the number of lower level peers that each upper level index peer contains, can be selected according to some network or performance criteria to optimize or improve network performance. Similarly, the maximum number of peers MAX in a ring at a level may also be pre-determined. Alternatively, the fan-out ratio and/or the value of MAX may be selected dynamically as the ring structure changes depending on some dynamic behaviors such as traffic flow, quality of service, delays, fault-tolerance criteria, etc. Furthermore, the number of levels may be determined in advance statically or dynamically according to some dynamic behaviors as discussed above. There are, however, at least two levels in the hierarchical ring structure.

A peer may connect to one or more peers at the lower level. Furthermore, more than one peer may connect to the same peer at the lower level. This kind of redundancy helps improve fault tolerance. For example, if peers P1 and P2 are connected to peer Q at the lower level and if peer P1 becomes faulty, then peer P2 still contains the information of peer Q. Therefore, any discovery or search process looking for information on peer Q can still be found via peer P2.

In the illustrative diagram shown in FIG. 1, peer $120_{k-1}^{m}$ is connected to peers $120_{k,1}^{u}$ of ring $110_{k,1}$ and peer $120_{k,1}^{v}$ of ring $110_{k,1}$. In other words, peer $120_{k-1}^{m}$ contains information regarding peers $120_{k,1}^{u}$ and $120_{k,1}^{v}$ in addition to all peers within its own ring. Peer $120_{k,1}^{w}$, peer $120_{k,L}^{x}$ and peer $120_{k,L}^{y}$ are all connected to peer $120_{k+1,M}^{t}$. Therefore, the information on peer $120_{k+1,M}^{t}$ is contained in all three peers $120_{k,1}^{w}$, $120_{k,L}^{x}$ and $120_{k,L}^{y}$. Since the structure does not have a single point of failure, it is highly fault-tolerant and highly available. In addition, the structure is highly scalable. There is no limit on the number of levels in the structure. Levels or rings may be added or deleted as the network of peers grows or shrinks. Unlike pure P2P technology which may create a lot of network traffic, the hierarchical ring structure does not generate as much traffic structure because peer locating or discovery occurs within peers that are connected and not all peers in the network.

Figure 2:
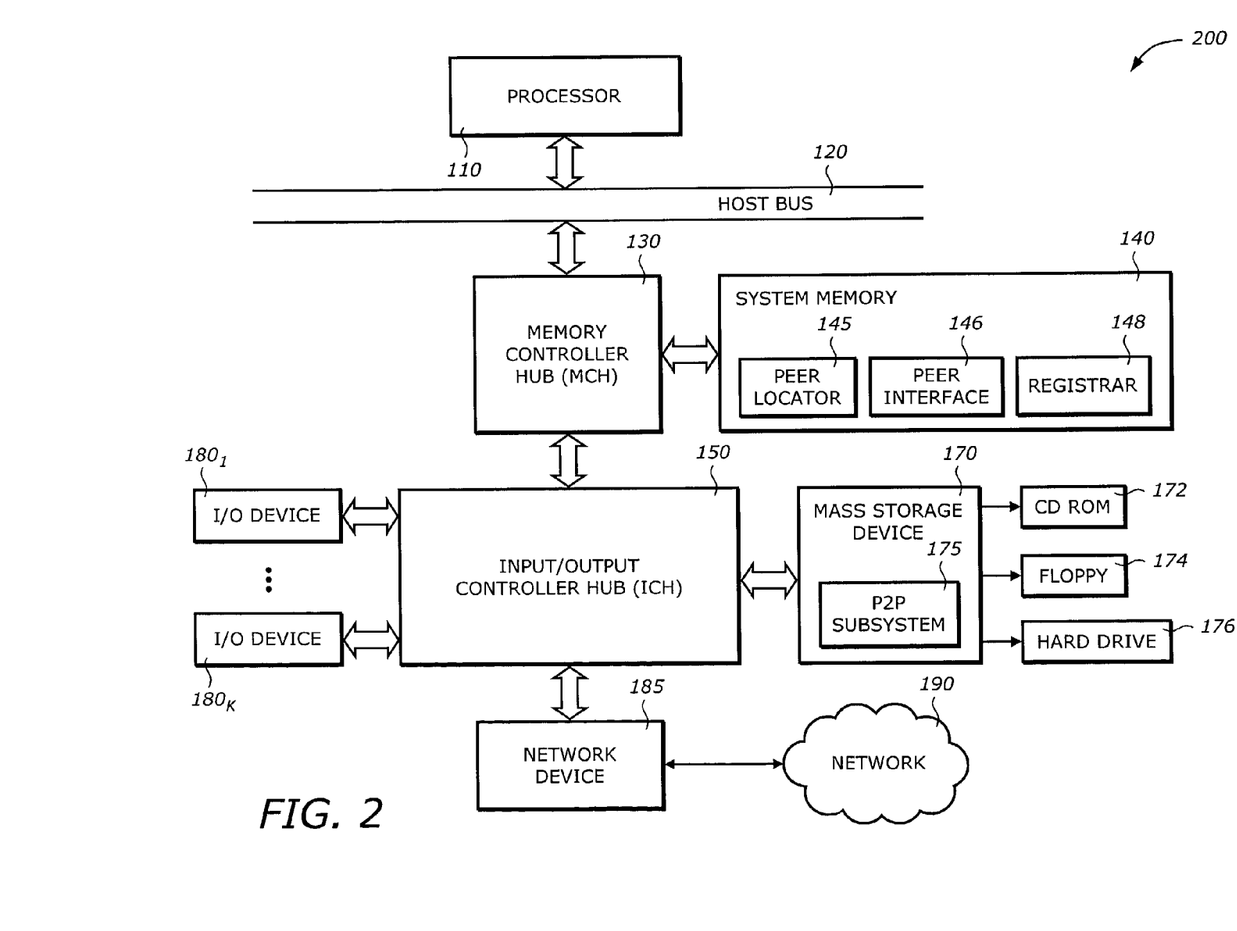
FIG. 2 is an exemplary diagram illustrating a peer shown in FIG. 1 according to one embodiment of the invention.

FIG. 2 is an exemplary diagram illustrating a peer 200 in which one embodiment of the invention can be practiced. For clarity, the system of subscripts and superscripts are dropped. The peer 200 may represent any peer shown in FIG. 1. The peer 200 includes a processor 110, a host bus 120, a memory control hub (MCH) 130, a system memory 140, an input/output control hub (ICH) 150, a mass storage device 170, input/output (I/O) devices $180_1$ to $180_K$, and a network device 185. A peer may include more or less elements than these elements.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface and memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a peer locator module 145, a peer interface module 146 and a registrar module 148. Any one of the peer locator module 145, the peer interface module 146 and the registrar module 148 may also be implemented by hardware, software, firmware, microcode, or any combination thereof. The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy diskettes 174, hard drive 176, and any other magnetic or optic storage devices. The mass storage device 170 provides a mechanism to read machine-readable media. In particular, the mass storage device 170 contains a P2P cache subsystem 175 that is used to keep tract of peer information. The cache P2P subsystem 175 may use any one of the peer locator module 145, the peer interface module 146 and the registrar module 148, or it may contain its own processor and hardware and/or software modules having the same functionalities.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics) and any other peripheral controllers.

The network device 185 provides interface to a network 190. The network device 185 has the proper protocol and interface circuitry to allow connections to the network 190. The network 190 is any private or public network that supports P2P communication. The network 190 may be a local area network (LAN), a wide area network (WAN), the Internet, an intranet, or an extranet.

Figure 3:
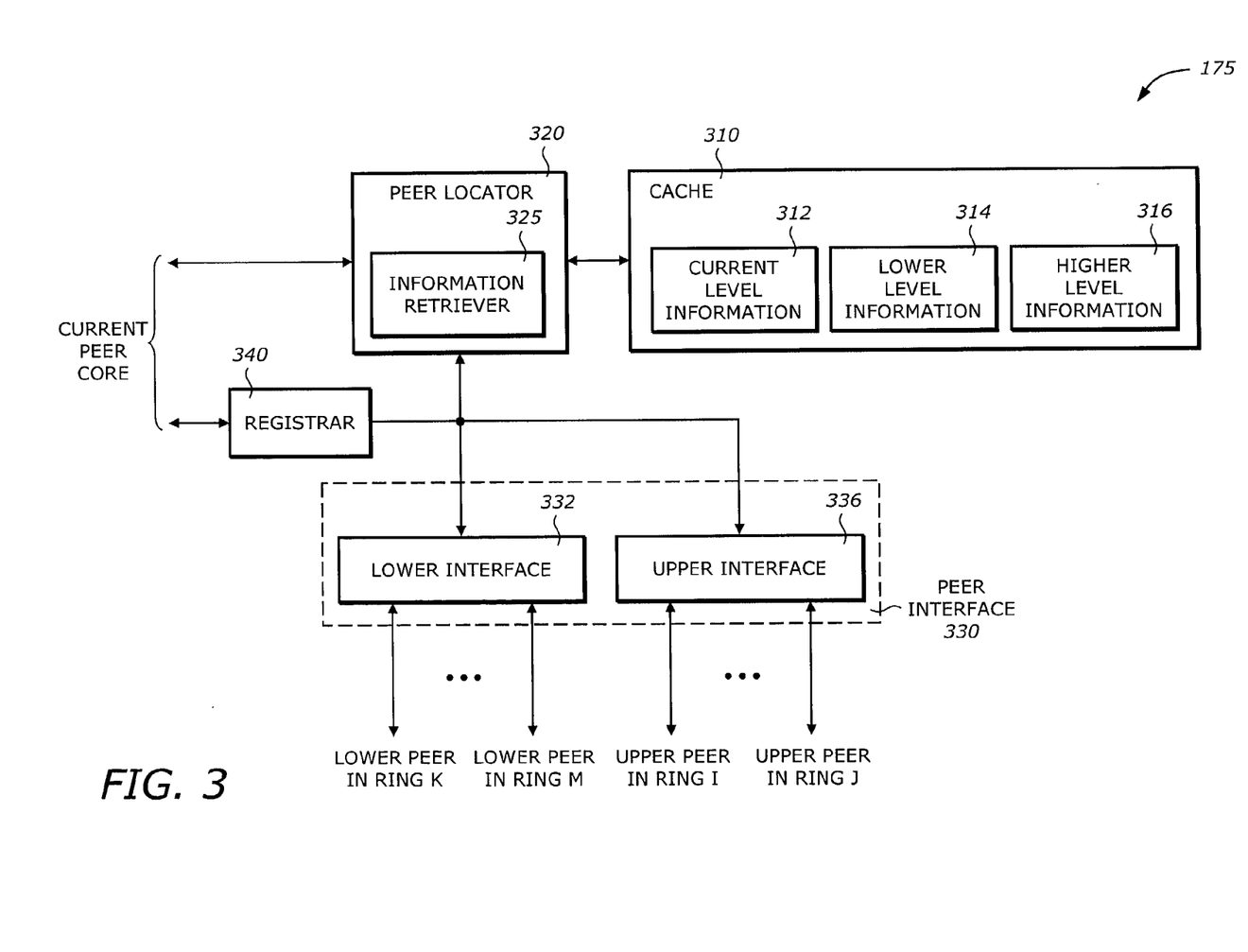
FIG. 3 is an exemplary diagram illustrating a P2P subsystem shown in FIG. 2 according to one embodiment of the invention.

FIG. 3 is an exemplary diagram illustrating the P2P subsystem 175 shown in FIG. 2 according to one embodiment of the invention. The subsystem 175 may be implemented as a combination of hardware and software. The peer locator module 145, the peer interface module 146 and the registrar module 148 shown in FIG. 2 may be used as part of the subsystem 175. The subsystem 175 includes a cache 310, a peer locator 320, a peer interface 330, and a registrar 340. It is contemplated that the subsystem 175 may contain more or less the components as shown.

The cache 310 is a mass storage device that can store information cached from the P2P communication. The information includes connectivity information such as the address information of the peers that are connected to the peer 120. This includes the information of the target peer if it is one of the peers that are connected to the peer 120. The cache 310 is used by a current peer 120 in a current ring at a current level to store information of ring peers within the current ring. As described in FIG. 1, the current ring is part of the hierarchical ring structure 100 of P2P nodes. The hierarchical ring structure has at least one of a lower level and a higher level with respect to the current level. The cache 310 stores a current level information 312, a lower level information 314 and a higher level information 316. The current level information 312 includes the information of the peers connected to the same ring as the current ring.

The lower level information 314 includes the information of all the peers at the lower level that are connected to the current peer 120. The higher level information stores information of all peers at the higher level that are connected to the current peer 120. In one embodiment, the higher level information 316 is not cached.

The information stored in the cache 310 does not have a Time-To-Live (TTL) field. The cached list of peers is pinged at a present time interval to check if these peers are still alive or connected to the current peer 120. If these peers are dead, the associated peer information in the cache 310 is taken out of the cache 310. Valid or current information of new peers is then requested. Since peer information is updated periodically, no stale information is kept in the cache 310 for a long time.

The peer locator 320 locates a target peer in the cache 310 in response to a request. The request may be initiated by a user of the peer 120, or received by a requesting peer from the current ring or from a lower level or a higher level. As discussed above, the peer locator 320 may use the peer locator module 145 or may be implemented as a separate component using hardware, software or a combination of hardware and software. The peer locator 320 includes an information retriever 325 to retrieve the information of the target peer from the cache 310 if the target peer is located in the cache 310.

The peer interface 330 interfaces to others peers in the system. As shown in FIG. 1. This peer may be a peer in the same ring, at a lower level and at a higher level. The peer interface 330 may also interface to peers in different rings at the same level, either lower level or higher level. Also as discussed above, the peer interface 330 may use the peer interface module 146 or may be implemented as a separate component using hardware, software or a combination of hardware and software. The peer interface 330 forwards the request to search for the target peer to a peer at the lower level or a peer at the upper level when the target peer is not located in the cache 310. In one embodiment, the peer interface 330 forwards the request only to a peer at the upper level that is connected to the current peer 120. The peer interface 330 includes a lower interface 332 and an upper interface 336.

The lower interface 332 interfaces to peers at the lower level. These peers may include peers that are in different rings or in the same ring. The lower interface 332 forwards the request to at least one of these lower peers in ring {K . . . M} to search for the target peer when the target peer is not located in the cache 310. The lower interface also receives the request from one of the lower peers that is connected to the current peer 120 to search for the target peer. When this occurs, the lower interface 332 passes the request to the peer locator 320 which then carries out the task of locating the target peer.

The upper interface 336 interfaces to peers at the upper level that are connected to the current peer 120. These upper peers in ring {I . . . J} may be in the same ring or in different rings. The upper interface 336 forwards the request to at least one of these upper peers to search for the target peer when the target peer is not located in the cache 310. The upper interface 336 also receives the request from one of these upper peers to search for the target peer. When this occurs, the upper interface 336 passes the request to the peer locator 320 for carrying out the search task.

The registrar 340 processes registration of the current peer 120 to the upper peers that are connected to the current peer 120. The registrar also processes registration of the lower peers to the current peer 120. When the current peer 120 registers to an upper peer, it transmits its information including its address and other pertinent information so that the upper peer can store this information in its cache for peer locating or discovery upon request. Similarly, when a lower peer registers to the current peer 120, it sends its information including its address and other pertinent information to the current peer 120 so that the current peer can store this information in the cache 310 for peer locating or discovery upon request.

Figure 4:
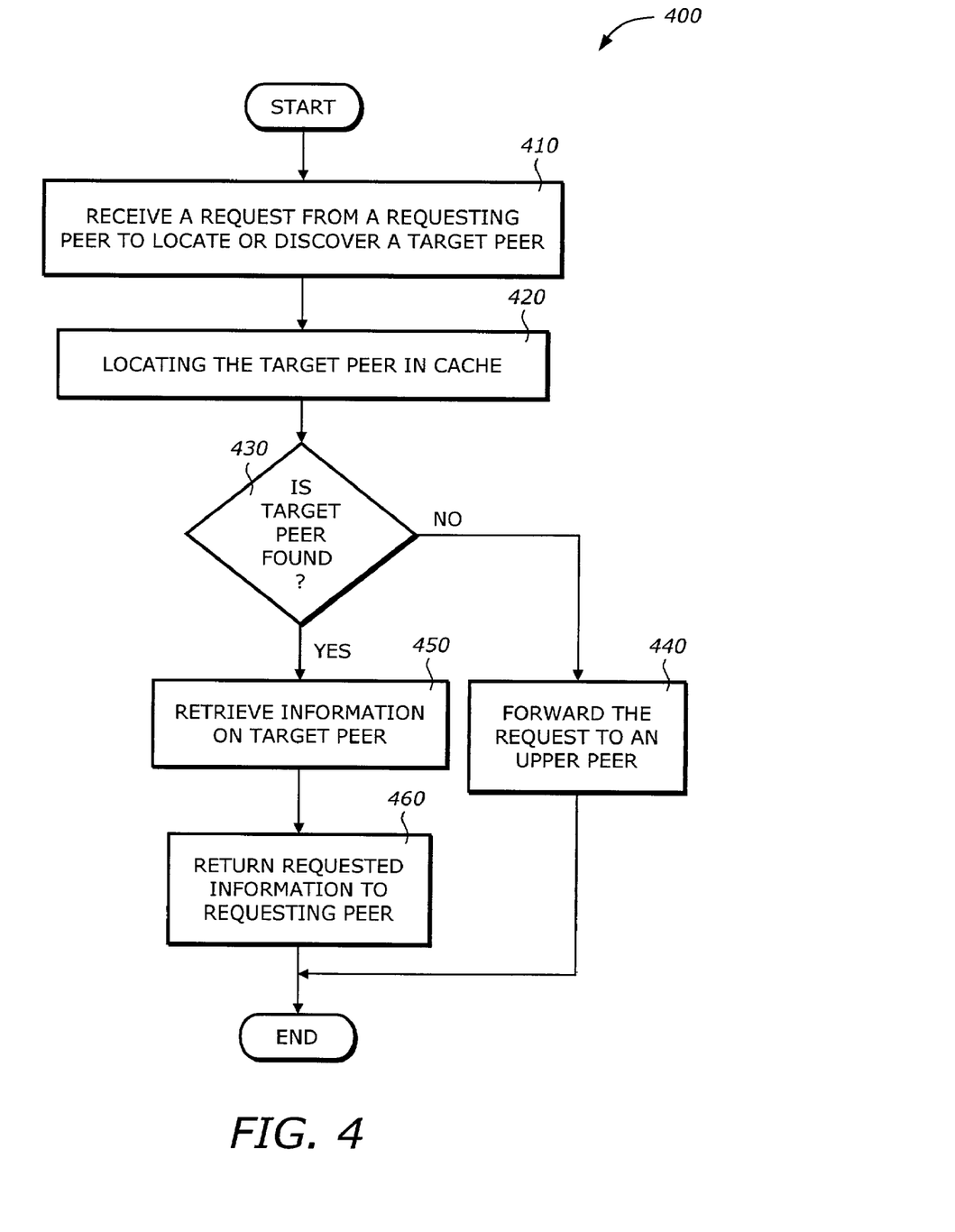
FIG. 4 is an exemplary flowchart illustrating a process for P2P communication using a hierarchical ring structure according to one embodiment of the invention.

FIG. 4 is an exemplary flowchart illustrating a process 400 for P2P communication using a hierarchical ring structure according to one embodiment of the invention.

Upon START, the process 400 receives a request or query from a requesting peer to locate or discover a target peer (Block 410). The requesting peer is normally a peer within the same ring or a lower peer having connection with the current peer. It is contemplated that the request may also come from an upper peer having connection with the current peer. The requesting peer has registered its information to the current peer. Then, the process 400 searches for the target peer in the cache (Block 420).

Next, the process 400 determines if the target peer is located in the cache (Block 430). If the target peer is not located in the cache, the process 400 forwards or escalates the request to an upper peer that is connected to the current peer (Block 440) and is then terminated. In one embodiment, the request is first forwarded or circulated to the peers in the same ring of the same hierarchy. If none of the peers in the same ring have the connectivity information in their respective caches, the request is sent to the upper peer. Note that in alternative embodiments, the request may be sent to the peers in the same ring either simultaneously or after sending the request to an upper peer. Also, the request may be sent to a lower peer simultaneously, before or after sending the request to the peers in the same ring and/or to an upper peer.

If the target peer is found in the cache, the process 400 retrieves the information on the target peer from the cache (Block 450). The information includes the address of the target peer. Thereafter, the process 400 returns the requested information to the requesting peer (Block 460) and is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus of comprising:
   a cache of a current peer in a current ring at a current level to store information of ring peers within the current ring, the current ring being part of an hierarchical ring structure of peer-to-peer (P2P) nodes, the hierarchical ring structure having at least one of a lower level and an upper level;
   a peer locator coupled to the cache to locate a target peer in the cache in response to a request to search for the target peer; and
   a peer interface coupled to the peer locator to interface to at least one of a first lower peer in a first lower ring at the lower level and a first upper peer in a first upper ring at the upper level, the peer interface to forward the request to search for the target peer to at least one of the first lower peer and the first upper peer when the target peer is not located in the cache;
   wherein the peer interface comprises:
   a lower interface to interface to at least one of the first lower peer and a second lower peer in a second lower ring at the lower level, the lower interface to forward the request to at least one of the first and second lower peers to search for the target peer when the target peer is not located in the cache; and
   an upper interface to interface to at least one of the first upper peer and a second upper peer in a second upper ring at the upper level, the upper interface to forward the request to at least one of the first and second upper peers to search for the target peer when the target peer is not located in the cache.

2. The apparatus of claim 1, wherein the lower interface to receive the request from at least one of the first and second lower peers to search for the target peer.

3. The apparatus of claim 1, wherein the upper interface to receive the request from at least one of the first and second upper peers to search for the target peer.

4. The apparatus of claim 1, wherein the cache stores information of at least one of the first and second lower peers.

5. The apparatus of claim 1, further comprising:
   a registrar to process registration of at least one of the current peer to the first upper peer and the first lower peer to the current peer, the registration including the information on one of the current peer, the first upper peer, and the first lower peer.

6. The apparatus of claim 1, wherein the peer locator comprises:
   an information retriever to retrieve the information of the target peer if the target peer is located in the cache.

7. The apparatus of claim 1, wherein the information includes an address of the target peer.

8. A method comprising:
   storing information of ring peers within a current ring at a current level in a cache of a current peer in the current ring, the current ring being part of an hierarchical ring structure of peer-to-peer (P2P) nodes, the hierarchical ring structure having at least one of a lower level and an upper level;
   locating a target peer in the cache in response to a request to search for the target peer; and
   interfacing to at least one of a first lower peer in a first lower ring at the lower level and a first upper peer in a first upper ring at the upper level to forward the request to search for the target peer to at least one of the first lower peer and the first upper peer when the target peer is not located in the cache;
   wherein interfacing comprises:
   interfacing to at least one of the first lower peer and a second lower peer in a second lower ring at the first lower level to forward the request to at least one of the first and second lower peers to search for the target peer when the target peer is not located in the cache; and
   interfacing to at least one of the first upper peer and a second upper peer in a second upper ring at the upper level to forward the request to at least one of the first and second upper peers to search for the target peer when the target peer is not located in the cache.

9. The method of claim 8, wherein interfacing to at least one of the first lower peer and a second lower peer comprises:
   receiving the request from at least one of the first and second lower peers to search for the target peer.

10. The method of claim 8, wherein interfacing to at least one of the first upper peer and a second upper peer comprises:

receiving the request from at least one of the first and second upper peers to search for the target peer.

11. The method of claim 8, wherein storing the information comprises:

storing the information of at least one of the first and second lower peers.

12. The method of claim 8, further comprising:

processing registration of at least one of the current peer to the first upper peer and the first lower peer to the current peer, the registration including the information on one of the current peer, the first upper peer, and the first lower peer.

13. The method of claim 8, wherein locating comprises:

retrieving the information of the target peer if the target peer is located in the cache.

14. The method of claim 8, wherein storing the information comprises:

storing an address of the target peer.

15. A system comprising:

a requesting peer to generate a request to search for a target peer; and a current peer in a current ring at a current level, the current ring being connected to the requesting peer in an hierarchical ring structure of peer-to-peer (P2P) nodes, the hierarchical ring structure having at least one of a lower level and a upper level, the current peer including a P2P subsystem, the P2P subsystem comprising:

a cache to store information of ring peers within the current ring, a peer locator coupled to the cache to locate the target peer in the cache in response to the request, and a peer interface coupled to the peer locator to interface to at least one of a first lower peer in a first lower ring at the lower level and a first upper peer in a first upper ring at the upper level, the peer interface to forward the request to search for the target peer to at least one of the first lower peer and the first upper peer when the target peer is not located in the cache;

wherein the peer interface comprises:

a lower interface to interface to at least one of the first lower peer and a second lower peer in a second lower ring at the lower level, the lower interface to forward the request to at least one of the first and second lower peers to search for the target peer when the target peer is not located in the cache; and an upper interface to interface to at least one of the first upper peer and a second peer in a second upper ring at the upper level, the upper interface to forward the request to at least one of the first and second upper peers to search for the target peer when the target peer is not located in the cache.

16. The system of claim 15, wherein the lower interface to receive the request from at least one of the first and second lower peers to search for the target peer.

17. The system of claim 15, wherein the upper interface to receive the request from at least one of the first and second upper peers to search for the target peer.

18. The system of claim 15, wherein the cache stores information of at least one of the first and second lower peers.

19. The system of claim 15, wherein the P2P subsystem further comprising:

a registrar to process registration of at least one of the current peer to the first upper peer and the first lower peer to the current peer, the registration including the information on one of the current peer, the first upper peer, and the first lower peer.

20. The system of claim 15, wherein the peer locator comprises:

an information retriever to retrieve the information of the target peer if the target peer is located in the cache.

21. The system of claim 15, wherein the information includes an address of the peer.

* * * * *

UNITED STATES PATENT AND TRADEMARK OFFICE
CERTIFICATE OF CORRECTION

PATENT NO. : 7,231,463 B2 Page 1 of 1
APPLICATION NO. : 10/036466
DATED : June 12, 2007
INVENTOR(S) : Nagendra et al.

It is certified that error appears in the above-identified patent and that said Letters Patent is hereby corrected as shown below:

In column 6, at line 28, delete "1. This" and insert --1, this--.

Signed and Sealed this

Fifteenth Day of April, 2008

JON W. DUDAS
*Director of the United States Patent and Trademark Office*